US008995460B1

United States Patent
Ashraf et al.

(10) Patent No.: US 8,995,460 B1
(45) Date of Patent: Mar. 31, 2015

(54) EMBEDDED CONTROL DATA IN COMMUNICATIONS SYSTEMS

(75) Inventors: Tauheed Ashraf, Bolingbrook, IL (US); Anthony John Cotter, Ballincollig (IE)

(73) Assignee: ARRIS Enterprises, Inc., Suwanee, GA (US)

( * ) Notice: Subject to any disclaimer, the term of this patent is extended or adjusted under 35 U.S.C. 154(b) by 223 days.

(21) Appl. No.: 13/471,023

(22) Filed: May 14, 2012

(51) Int. Cl.
| H04L 12/54 | (2013.01) |
| H04L 12/861 | (2013.01) |
| H04L 12/883 | (2013.01) |
| H04L 12/947 | (2013.01) |
| H04N 21/434 | (2011.01) |

(52) U.S. Cl.
CPC ............. *H04L 12/54* (2013.01); *H04L 49/252* (2013.01); *H04N 21/4341* (2013.01); *H04L 49/9015* (2013.01)
USPC ........... 370/429; 370/412; 370/474; 370/535; 370/252

(58) Field of Classification Search
None
See application file for complete search history.

(56) References Cited

U.S. PATENT DOCUMENTS

| 5,790,554 | A  * | 8/1998  | Pitcher et al. ............... 370/471 |
| 6,490,248 | B1 * | 12/2002 | Shimojo ..................... 370/229 |
| 6,724,767 | B1 * | 4/2004  | Chong et al. ................ 370/412 |
| 8,284,772 | B1 * | 10/2012 | James-Roxby et al. ...... 370/389 |
| 8,326,938 | B1 * | 12/2012 | Chiang et al. ............... 709/212 |
| 8,437,266 | B2 * | 5/2013  | Steiner ....................... 370/252 |
| 8,494,342 | B2 * | 7/2013  | Itoh et al. ................... 386/239 |
| 8,542,693 | B2 * | 9/2013  | Soni et al. .................. 370/412 |
| 2004/0028067 | A1 * | 2/2004 | Chong et al. ................ 370/412 |
| 2006/0193348 | A1 * | 8/2006 | Unno et al. ................. 370/535 |
| 2008/0288375 | A1 * | 11/2008 | Uhrig et al. .................. 705/30 |
| 2010/0218227 | A1 * | 8/2010 | Frink et al. ................... 725/93 |

\* cited by examiner

*Primary Examiner* — Candal Elpenord
(74) *Attorney, Agent, or Firm* — Troy A. Van Aacken

(57) ABSTRACT

Systems and methods can operate to transmit embedded control data (ECD) information within the payload of packet data. Payload packet data can contain a plurality of data elements of equal value. A transmitter can replace the repeating data elements with ECD information. A receiver can extract the ECD information and replace with the repeating data value to reconstruct the original. ECD information can be communicated between communication systems and between interfaces within a communication system.

19 Claims, 5 Drawing Sheets

EMBEDDED CONTROL DATA IN COMMUNICATIONS SYSTEMS

TECHNICAL FIELD

This disclosure relates to repeating data payload patterns in communications packets.

BACKGROUND

Communication systems can be used to send payload packet data from one system to another or between network interfaces within a communication system. The payload packet data can contain user/application data and protocol information (e.g., transport control protocol (TCP), internet protocol (IP) and media access control (MAC)). In a communication system a transmitter in one system can send payload packet data that is received by a receiver in a second system. The payload packet data can be constant bit rate or variable bit rate. In addition to sending and receiving payload packet data, a communication system can be required to send control data from one system to another. Control data can include register updates, system monitoring and event/event status information. Embedded control data (ECD) information can be variable bit rate in nature. Payload packet data can contain repeating data patterns that can be used for the transport of ECD information between communications systems or interfaces within a communication system without affecting the bandwidth of constant bit rate or variable bit rate payload packet data.

BRIEF DESCRIPTION OF THE DRAWINGS

Like reference numbers and designations in the various drawings indicate like elements.

DETAILED DESCRIPTION

In some implementations of this disclosure, methods, systems, and apparatus can operate to transport ECD information injected in payload data communicated between network interfaces in a communication system.

Figure 1:
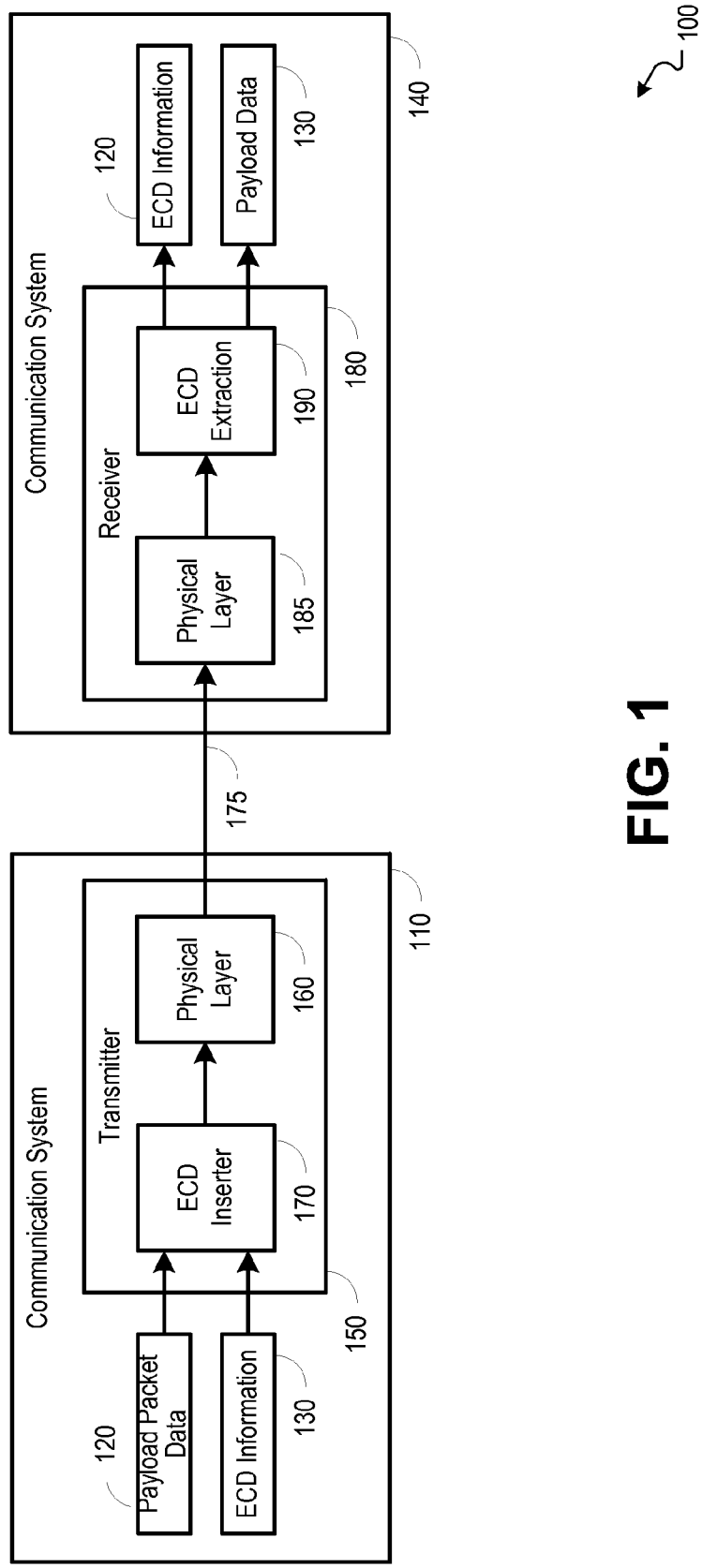
FIG. 1 is a block diagram illustrating an example network environment operable to transport payload data and ECD information between network interfaces within a communication system.

FIG. 1 is a block diagram illustrating an example network environment operable to transport payload packet data and ECD information between communication devices. In some implementations, communication device 110 can transmit payload packet data 120 and ECD information 130 to communication device 140. In other implementations transmit payload data 120 and ECD information 130 can be transmitted and received by interfaces within a communication system (not shown) Communication device 110 can include a transmitter 150 to send payload packet data 120 and ECD information 130 with physical layer 160. In some implementations, physical layer 160 can be based on 802 ethernet standards. In other implementations, physical layer 160 can be based on the serial packet interface (SPI) protocol. In some implementations a communication link 175 can provide the physical connection between communication devices 110 and 140. In other implementations, a backplane (not shown) can provide the physical connection between two interfaces within a communication system.

Transmitter 150 can include an ECD inserter 170 to insert ECD 130 information into payload packet data 120 for transmission. Communication system 140 can include a receiver 180 to receive payload packet data 120 with inserted ECD information 130 on communication link 175 through physical layer 185. Receiver 180 can include an ECD extractor 190 to separate payload packet data 120 and ECD information 130.

Figure 2:
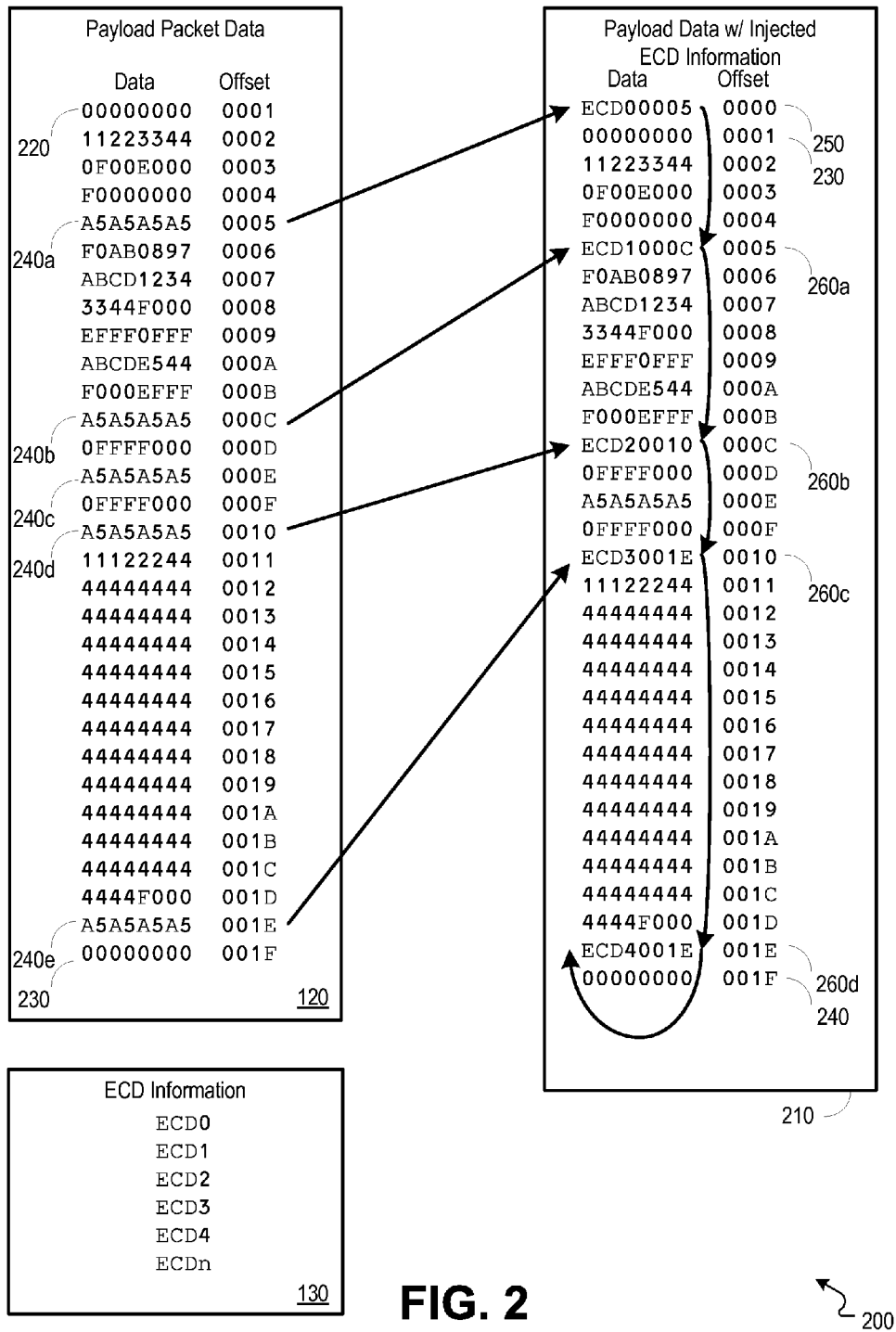
FIG. 2 illustrates an example of payload packet data, ECD information and payload packet data with injected ECD information.

FIG. 2 illustrates an example of payload packet data, ECD information and payload packet data with injected ECD information. While FIG. 2 contains example offsets to the right of the data elements, the offsets are only for illustration. In some implementations, payload packet data 120 can represent a 256 byte packet. In other implementations, the length of the packet can be of other sizes. Furthermore, the length of packets can vary from one packet to the next. The payload packet data can contain a start of packet data element 220 and an end of packet data element 230. The payload packet data can contain repeating data patterns 240a-240e. In some implementations the repeating data patterns can occur on 8 byte aligned boundaries. In other implementations the repeating data patterns can occur on other boundaries. In some implementations, ECD information 130 can be 4 bytes in length. In other implementations the ECD information can be of other lengths.

Payload packet data 120 can contain a repeating data element that can be replaced with ECD information elements 130. In some implementations, the first data element of the payload data with injected ECD information element 210 can contain a header 250. Header 250 can contain an ECD0 information element of 4 bytes and pointer of 4 bytes in size. In other implementations the ECD information element and the pointer can be of other sizes. In yet other implementations, the sizes of the ECD information element and pointer can be of different sizes. In some implementations, header 250 can contain a pointer representing the location of the next ECD information element (i.e., ECD1) that can be injected in the payload packet data. Data element 260a can contain the next ECD information element (i.e., ECD1) and pointer to next ECD information element 260b. The payload packet data can contain a repeating data pattern 240c that is not injected with an ECD information element. In some implementations, the last ECD information element 260d can be the last ECD information element added to payload packet data 120 with injected ECD information and can contain a pointer, pointing to itself. In other implementations, another pointer value can be used to indicate the last ECD information 260d element in the packet.

Figure 3:
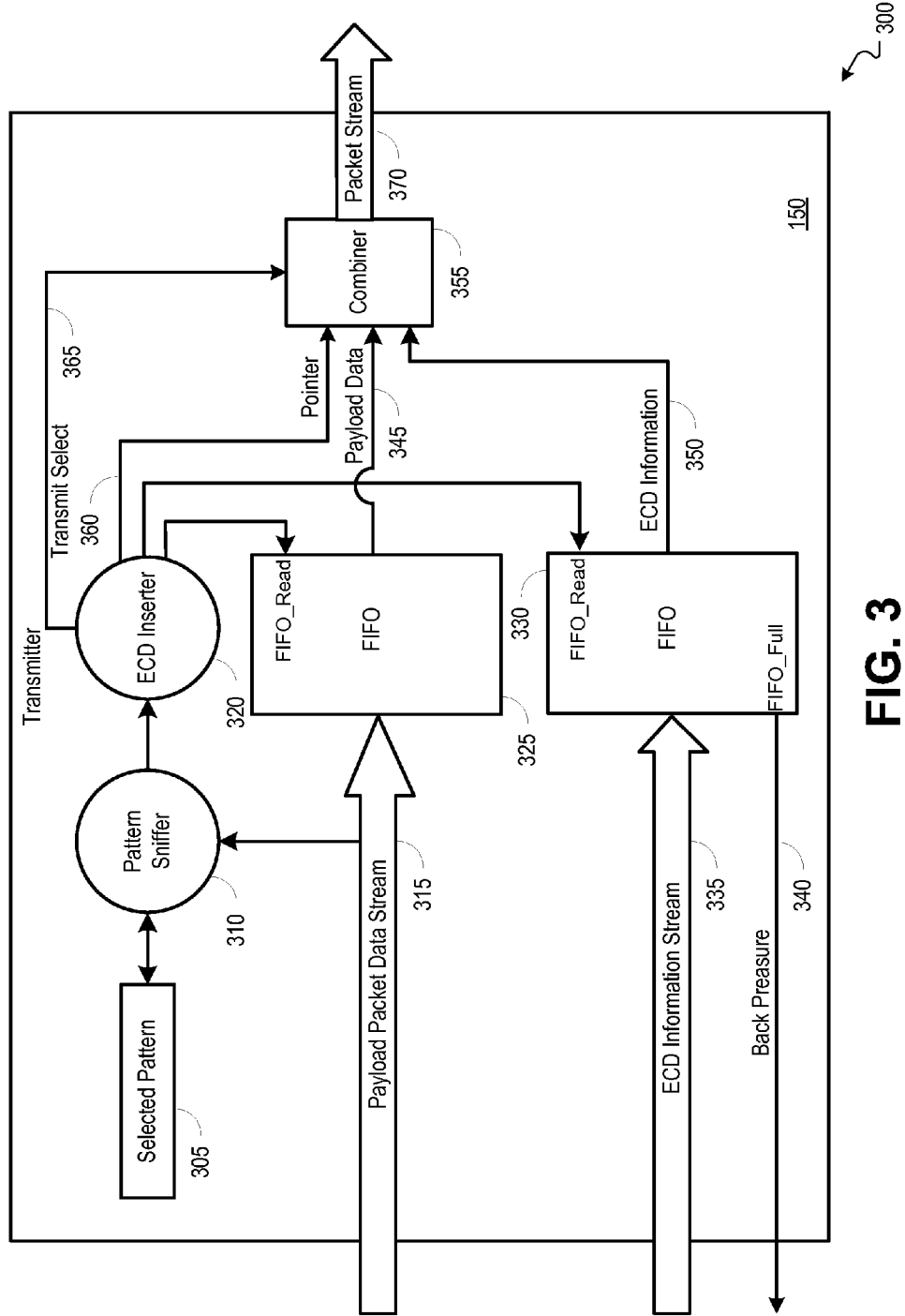
FIG. 3 is a block diagram illustrating an example transmitter operable to insert ECD information into payload packet data.

FIG. 3 is a block diagram illustrating an example transmitter operable to insert ECD information (e.g., ECD information 130 of FIG. 1) into payload packet data (e.g., payload packet data 120 of FIG. 1). In some implementations the transmitter 150 can include a selected pattern 305. Selected pattern 305 can provide a value that can represent a repeating pattern (e.g., repeating pattern 240a-240e of FIG. 2) contained in the payload packet data. The selected pattern 305 can be provided to the packet sniffer 310.

In some implementations, the pattern sniffer 310 can examine the payload packet data stream 315 for the occurrence of a selected pattern 305. The pattern sniffer 310 is operable to examine the payload data stream 315 at line rate (i.e., the throughput of the payload packet data stream is not affected by pattern sniffer operations). The pattern sniffer 310 can provide the ECD inserter 320 with the offset of a repeating pattern (e.g., repeating pattern 240a-240e of FIG. 2). The offset can represent the location of the repeating pattern with respect to the start of packet data element (e.g., start of packet 220 of FIG. 2).

In some implementations the transmitter (e.g., transmitter 150 of FIG. 1) can include a first-in/first-out buffer (FIFO) 325 for temporary storage of the payload packet data stream 315 and FIFO 330 for temporary storage of the ECD information stream 335. In other implementations, a different type of storage element can be used. FIFO 330 can become full, and can include back pressure indication 340 informing the communication system (e.g., communication system 110 of FIG. 1) to pause sending ECD information (e.g., ECD information 130 of FIG. 1).

In some implementations, the ECD inserter 320 can control the output of FIFO 325 and 330 to output the next payload data element 345 and the next ECD information element 350. The output of FIFO 325 and 330 provide payload data 345 and ECD information 350 to combiner 355. In some implementations, the ECD inserter 320 can provide a pointer 360 to combiner logic 355. The pointer 360 can identify a location at which a repeating data pattern has been inserted into the stream.

In some implementations, a repeating data pattern (e.g., repeating data pattern 240a-e of FIG. 2) can be replaced with an ECD information 350 and offset pointer 360. In some implementations, the ECD inserter 320 can instruct the combiner 355 to either transmit payload data 345 or ECD information 350 with pointer 360 through transmit select 365 producing packet stream 370.

In some implementations pattern sniffer 310 can examine the payload packet data stream 315 for occurrences of repeating data patterns over a period of time and change the selected pattern 305. In other implementations pattern sniffer 310 can examine the payload data stream 315 for occurrences of repeating data pattern of a number of packets. The transmitter (e.g., transmitter 150 of FIG. 1) can communicate the change of the selected pattern 305 to the receiver (e.g., receiver 180 of FIG. 1) through ECD information (ECD information 130 of FIG. 1).

FIFO 325 can introduce latency in the transmission of the payload packet data (e.g., payload packet data 120 of FIG. 1) since buffering occurs. In some implementations, ECD inserter 320 can contain a latency timer that can be started at start of packet (e.g., start of packet 220 of FIG. 2). In some implementations, if the latency timer reaches a predetermined threshold the next ECD information 350 and pointer 360 elements can be the last transmitted in packet stream 370 and no further ECD injection will occur until the next packet of the payload packet stream 315.

Figure 4:
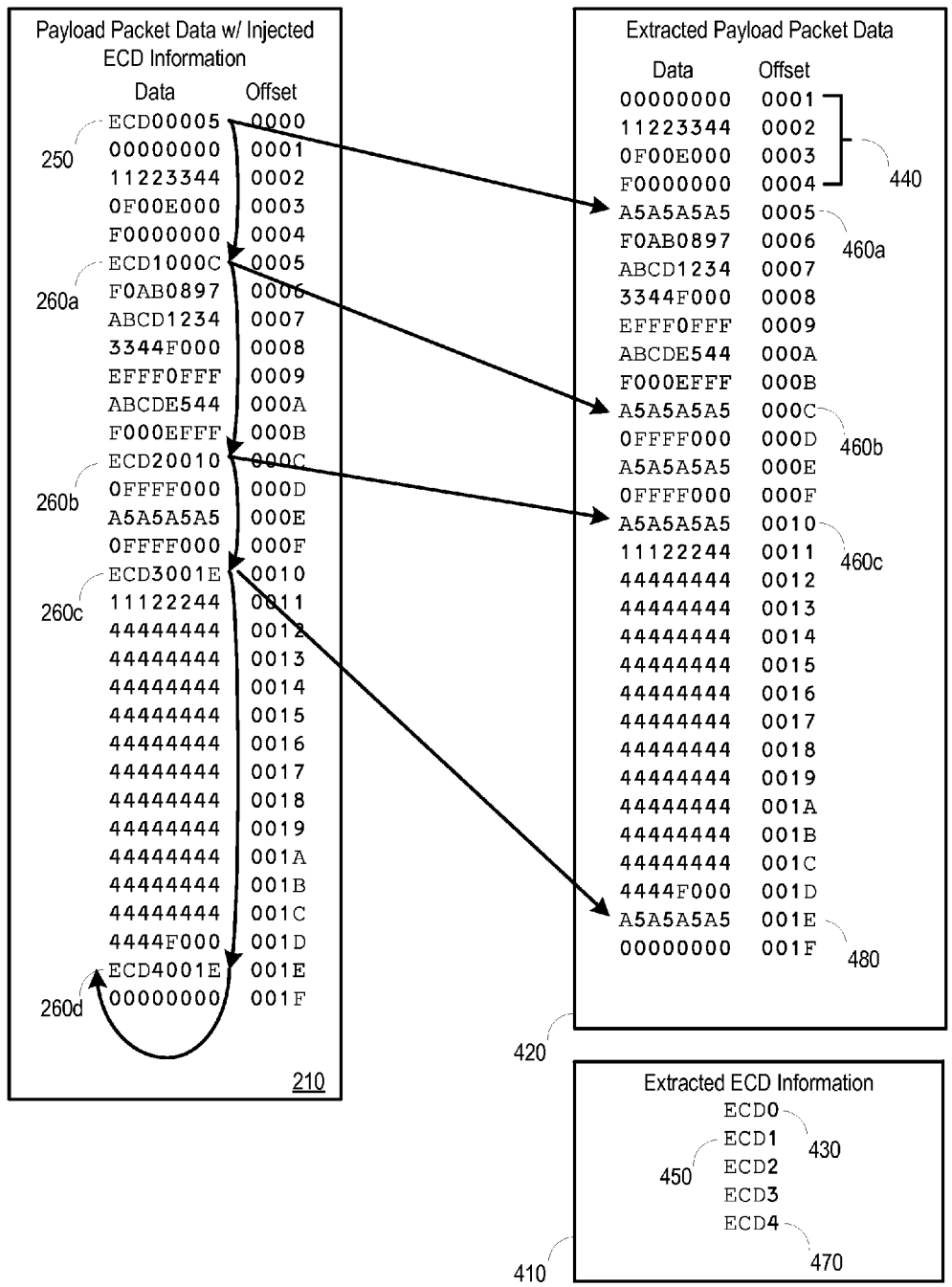
FIG. 4 illustrates an example of payload packet data with inserted ECD information and extracted payload packet data and ECD information.

FIG. 4 illustrates an example of payload packet data with inserted ECD information, extracted payload packet data and extracted ECD information. While FIG. 4 contains offsets to the right of the data elements, the offsets are only for illustration. In some implementations, payload packet data with inserted ECD information 210 can contain a header 250. The header 250 can contain an ECD0 information element and a pointer to the ECD1 information element 260a. The receiver (e.g., receiver 180 of FIG. 1) can extract the ECD0 information element, as illustrated in extracted ECD information 410 at location 430 from header 250. The receiver can extract a pointer from header 250. The header 250 can be discarded by the receiver after extraction of the ECD0 information element 430 and the pointer.

In some implementations, the receiver (e.g., receiver 180 of FIG. 1) can extract and append payload packet data from the payload packet data with injected ECD information 210 as illustrated in extracted payload packet data 420 at locations 440 until the ECD1 information element 260a and pointer is reached. The pointer identifies the location of the ECD2 information element 260b in the payload packet data 210 with inserted ECD1 information 260b. At this point, the receiver can then extract the ECD1 information element 260a and append it to the extracted ECD information 410 at location 450. The repeating data pattern (e.g., repeating data pattern 240a-e of FIG. 2) can be appended to the extracted payload packet data 420 at location 460a and the pointer to the ECD2 information element 260b is saved. The receiver can continue this process until the last ECD4 information element 260d is reached. In some implementations, the last ECD information element 260d can be identified by a pointer accompanying the ECD information element pointing to itself. At this point, the receiver can then extract the ECD4 information element 260d and append it to the extracted ECD information 410 at location 470. The repeating data pattern can be appended to the extracted payload packet data 420 at location 480. The receiver can continue to extract payload packet data and append to the extracted payload packet data 420 until the complete payload packet data with injected ECD information 210 is received.

Figure 5:
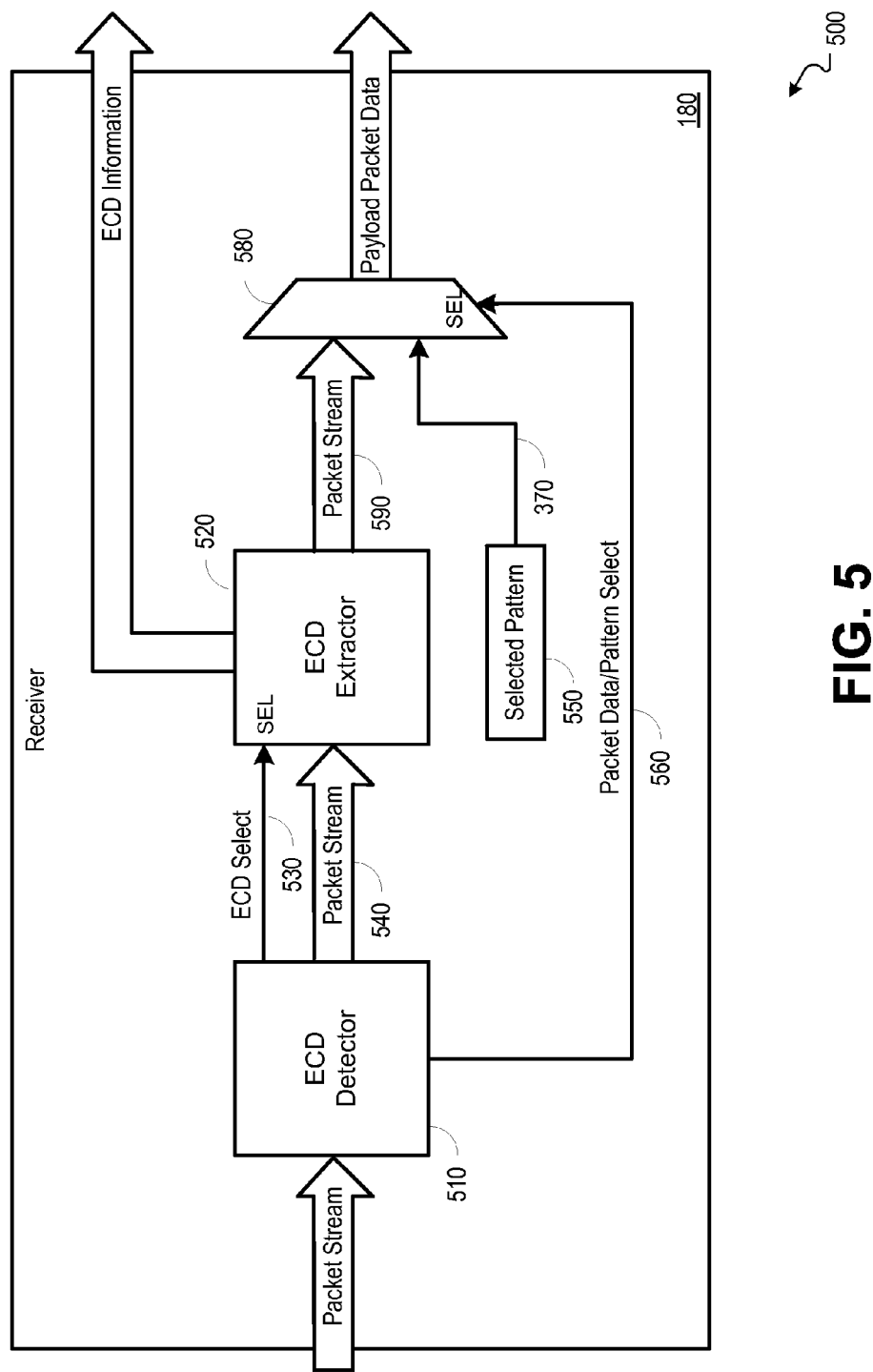
FIG. 5 is a block diagram illustrating a receiver operable to extract payload packet data and ECD information from payload packet data with injected ECD information.

FIG. 5 is a block diagram illustrating a receiver operable to extract payload packet data and ECD information from payload packet data with injected ECD information. In some implementations, the receiver 180 can include an ECD detector 510. The ECD detector can receive a payload packet data with injected ECD information packet stream 370. The ECD detector 510 can recognize a header (e.g., header 250 of FIG. 2) indicating the received packet contains ECD information (e.g., ECD information 250 and 260a-d of FIG. 2). The ECD detector 510 can strip the header from the received packet stream. In some implementations, using the pointer contained with the ECD information, the ECD detector 510 can instruct the ECD Extractor 520 through ECD select 530 to extract ECD information elements from packet stream 540 reconstructing ECD information (e.g. ECD information 130 of FIG. 1).

The selected pattern 550 can contain the value of the repeating data pattern (e.g., repeating data pattern 240a-e of FIG. 2) that can be used to reconstruct the payload packet data (e.g., payload packet data 120 of FIG. 1) where ECD information elements (e.g., ECD information elements 260a-d of FIG. 2) are replaced with the selected pattern 550. In some implementations, the selected pattern 550 can be same for a plurality of packets. In other implementations, the selected pattern 550 can be changed dynamically (not shown).

In some implementations, using the pointer contained with the ECD information, the ECD detector 510 can instruct the data selector 580 through packet/data pattern select 560 to select between packet stream 590 or selected pattern 550 reconstructing the payload data packet (e.g., payload data packet 120 of FIG. 1).

While this specification contains many specific implementation details, these should not be construed as limitations on the scope of any invention or of what may be claimed, but rather as descriptions of features that may be specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A system comprising:
a first buffer operable to receive a packet data stream;
a second buffer operable to receive embedded control data associated with the packet data stream;
a selected pattern data value comprising a repeating pattern found in a packet of the packet data stream and having defined and aligned boundaries;
a pattern sniffer operable to detect a plurality of locations in the received packet data stream equal to the selected pattern data value;
an inserter operable to instruct a combiner to select one of a first and second input to generate an output data packet stream, the first input of the inserter comprising output from the first buffer and the second input of the inserter is output from the second buffer, the output of the second buffer comprising the embedded control data to be substituted for the selected pattern data value, the embedded control data including a pointer associated with a location of a next instance of the embedded control data thereby creating a linked list identifying each instance of the selected data pattern value in the packet data stream.

2. The system of claim 1, wherein the received packet data stream comprises embedded control data information.

3. The system of claim 2, wherein the selected pattern data value is determined through inspecting a plurality of received packet data streams.

4. The system of claim 3, wherein embedded control data is used to transmit the selected pattern data value to a receiver.

5. The system of claim 1, wherein the second buffer is operable to provide notification wherein the received packet data stream cannot be buffered.

6. The system of claim 1, wherein expiration of a latency timer results in the system transmitting the output packet data stream.

7. The system of claim 1, wherein a medium used to transmit the output packet data stream comprises a back plane.

8. The system of claim 7, wherein a serial packet interface (SPI) protocol is used for transmission of the output packet data stream.

9. The system of claim 1, wherein the medium to transmit the output packet data stream comprises a communications link.

10. The system of claim 9, wherein an Ethernet protocol is used for the transmission.

11. A system comprising;
a detector operable to receive a packet data stream and to identify embedded control data in the packet data stream;
an extractor operable to receive the packet data stream and to extract the identified embedded control data from said packet data stream;
a selected pattern data value comprising a repeating pattern found in a packet of the packet data stream and having defined and aligned boundaries; and
a data selector operable to produce an output data stream comprising either payload data or the selected pattern data value, depending on the identified embedded control data; and
wherein the identified embedded control data received in the packet data stream comprises a pointer that identifies a location of a next data element of the embedded control data in the received packet data stream thereby creating a linked list identifying each instance of the selected data pattern value in the packet data stream.

12. The system of claim 11, wherein the selected pattern data value is determined through information contained in the packet data stream.

13. The system of claim 11, wherein a first data element of the receive packet data stream comprises a header identifying the receive packet data stream and includes the embedded control data.

14. The system of claim 13, wherein a last data element of data of the embedded control data in the receive packet data stream comprises a pointer wherein the pointer references itself.

15. A computer-implemented method comprising:
receiving an input packet data stream;
receiving control data to be embedded in the input packet data stream;
identifying locations in the input packet data stream comprising at least one repeating data pattern identified within the input packet data stream; and
generating a output packet data stream comprising the input packet stream and the control data, wherein the repeating data pattern in the input packet stream are replaced with embedded control data, the embedded control data marking the repeating data pattern and identifying a location associated with a next instance of the embedded control data in the output packet data stream thereby creating a linked list identifying each instance of a selected data pattern in the packet data stream.

16. The method of claim 15, further comprising:
receiving the output packet data stream;
extracting the embedded control data from the output packet data stream; and
extracting the input packet stream wherein the packet locations used for the embedded control data are replaced with the repeating data pattern.

17. The method of claim 15, wherein a first data element of the output packet stream is a header comprising embedded control data information and a pointer wherein the pointer references the next location in the output packet comprising embedded control data information.

18. The method of claim 15, wherein a last embedded control data element in the output packet comprises embedded control data information and a pointer wherein the pointer references the location of the last embedded control data information location in the output packet.

19. The method of claim 15, wherein the repeating data pattern is determined through inspecting a plurality of received packet data streams.

* * * * *